(12) United States Patent
Schaftenaar

(10) Patent No.: US 10,081,490 B2
(45) Date of Patent: Sep. 25, 2018

(54) TELESCOPING DUNNAGE RACK

(71) Applicant: Diverse Global Industrial Solutions, Saugatuck, MI (US)

(72) Inventor: Robert Schaftenaar, Saugatuck, MI (US)

(73) Assignee: Diverse Global Industrial Solutions, Saugatuck, MI (US)

( * ) Notice: Subject to any disclaimer, the term of this patent is extended or adjusted under 35 U.S.C. 154(b) by 0 days.

(21) Appl. No.: 15/679,792

(22) Filed: Aug. 17, 2017

(65) Prior Publication Data

US 2018/0215538 A1    Aug. 2, 2018

Related U.S. Application Data

(63) Continuation of application No. 15/419,363, filed on Jan. 30, 2017, now Pat. No. 9,738,447.

(51) Int. Cl.
*G06F 7/00* (2006.01)
*B65G 1/02* (2006.01)
*B65D 85/68* (2006.01)
*A47B 45/00* (2006.01)

(52) U.S. Cl.
CPC .............. *B65G 1/023* (2013.01); *A47B 45/00* (2013.01); *B65D 85/68* (2013.01)

(58) Field of Classification Search
None
See application file for complete search history.

(56) References Cited

U.S. PATENT DOCUMENTS

| | | | |
|---|---|---|---|
| 1,216,250 A | | 2/1917 | Bittle |
| 2,575,751 A | | 11/1951 | Donnelley |
| 3,858,731 A | * | 1/1975 | Briggs .................... A01G 25/09 198/394 |
| 6,123,208 A | * | 9/2000 | Haenszel ............... A47B 45/00 108/55.1 |
| 6,230,916 B1 | | 5/2001 | Bradford et al. |
| 6,422,405 B1 | | 7/2002 | Haenszel |
| 6,601,928 B1 | | 8/2003 | Kortman et al. |
| 8,770,430 B2 | | 7/2014 | Nyeboer et al. |
| 9,452,865 B2 | | 9/2016 | Joshi et al. |
| 9,534,834 B1 | | 1/2017 | Klassen |
| 2008/0023470 A1 | | 1/2008 | Bradford |
| 2008/0237225 A1 | | 10/2008 | Owen |
| 2009/0118858 A1 | | 5/2009 | Wallace et al. |

FOREIGN PATENT DOCUMENTS

| | | |
|---|---|---|
| CA | 2813410 A1 | 10/2014 |
| CN | 201911614 U | 8/2011 |
| FR | 2883242 A1 | 9/2006 |

* cited by examiner

*Primary Examiner* — Yolanda Renee Cumbess
(74) *Attorney, Agent, or Firm* — Price Heneveld LLP

(57) ABSTRACT

An adjustable rack assembly includes a base frame defining an upper end and an open front side and an extension frame defining an upper end, a bottom end and an open front side. The extension frame is slidably mounted to the base frame. The assembly further includes an actuator coupled between the base frame and the extension frame and operable to move the extension frame between a collapsed position and an extended position. A compartment unit is supported by the extension frame and is at least partially collapsible to accommodate the movement of the extension frame between the collapsed position and the extended position.

19 Claims, 16 Drawing Sheets

TELESCOPING DUNNAGE RACK

CROSS-REFERENCE TO RELATED APPLICATION

This application is a continuation of U.S. patent application Ser. No. 15/419,363, now U.S. Pat. No. 9,738,447, filed on Jan. 30, 2017, entitled "TELESCOPING DUNNAGE RACK," the disclosure of which is hereby incorporated herein by reference in its entirety.

BACKGROUND OF THE INVENTION

Assembly of various goods, including various components and subassemblies of goods on an assembly line, requires the availability of the parts to-be assembled at the location of their assembly on the line. In many instances, transportable racks are used to transport parts to an assembly location. These racks can be moved to the location at which the parts are stored and loaded to various compartments, or areas, of the rack, often in manner corresponding to the order of their assembly. The racks are then moved to a specific location on the line where the included parts are needed. Because the parts are often removed from the rack by a human working on the line, the racks are limited in height to what is accessible by the average worker. Further, the number of racks on a line can be limited by the available area adjacent the various stations, as well as the number of racks that can be towed or otherwise transported in a "train" of such racks in one operation. However, such limitations may reduce the number of parts that can be provided to a line at a given time, which may increase the frequency with which racks must be swapped out for refilling. Accordingly, further advances are desired.

SUMMARY OF THE INVENTION

According to an aspect of the disclosure, an adjustable rack assembly includes a base frame defining an upper end and an open front side and an extension frame defining an upper end, a bottom end and an open front side. The extension frame is slidably mounted to the base frame. The assembly further includes an actuator coupled between the base frame and the extension frame and operable to move the extension frame between a collapsed position, in which the top end of the extension frame is adjacent to the top end of the base frame, and an extended position, in which the top end of the extension frame is moved away from the top end of the base frame and the bottom end of the extension frame is moved toward the top end of the base frame. A compartment unit is supported by the interior frame and is at least partially collapsible to accommodate the movement of the extension frame between the collapsed position and the extended position.

According to another aspect of the disclosure, a transportation rack includes a base unit configured for resting on a surface and including a lower interior side and an upper side and an extension unit slidably mounted with the base unit and defining an upper member coupled on an upper end of the extension unit. The rack further includes an actuator coupled between the lower interior side of the base frame and the upper member of the extension frame and operable to move the extension frame in an extending direction, wherein the upper end of the extension unit moves away from the upper side of the base unit, and a collapsing direction, wherein the upper end of the extension unit moves toward the upper side of the base unit.

According to another aspect of the disclosure, a method for providing parts to a production line includes selectively removing parts from a lower section of a compartment unit of a rack that includes a base unit defining an upper end and an extension unit slidably mounted with the base unit. The lower section of the compartment is accessed through an open front side of the base unit. The method further includes, when the parts have been removed from the lower section, lowering the extension unit with respect to the base unit, the compartment unit partially collapsing to accommodate the lowering of the extension unit, and removing parts from an upper portion of the compartment unit through the open side of the base unit and through an open side of the extension unit.

These and other features, advantages, and objects of the present invention will be further understood and appreciated by those skilled in the art by reference to the following specification, claims, and appended drawings.

DETAILED DESCRIPTION

Figure 1:
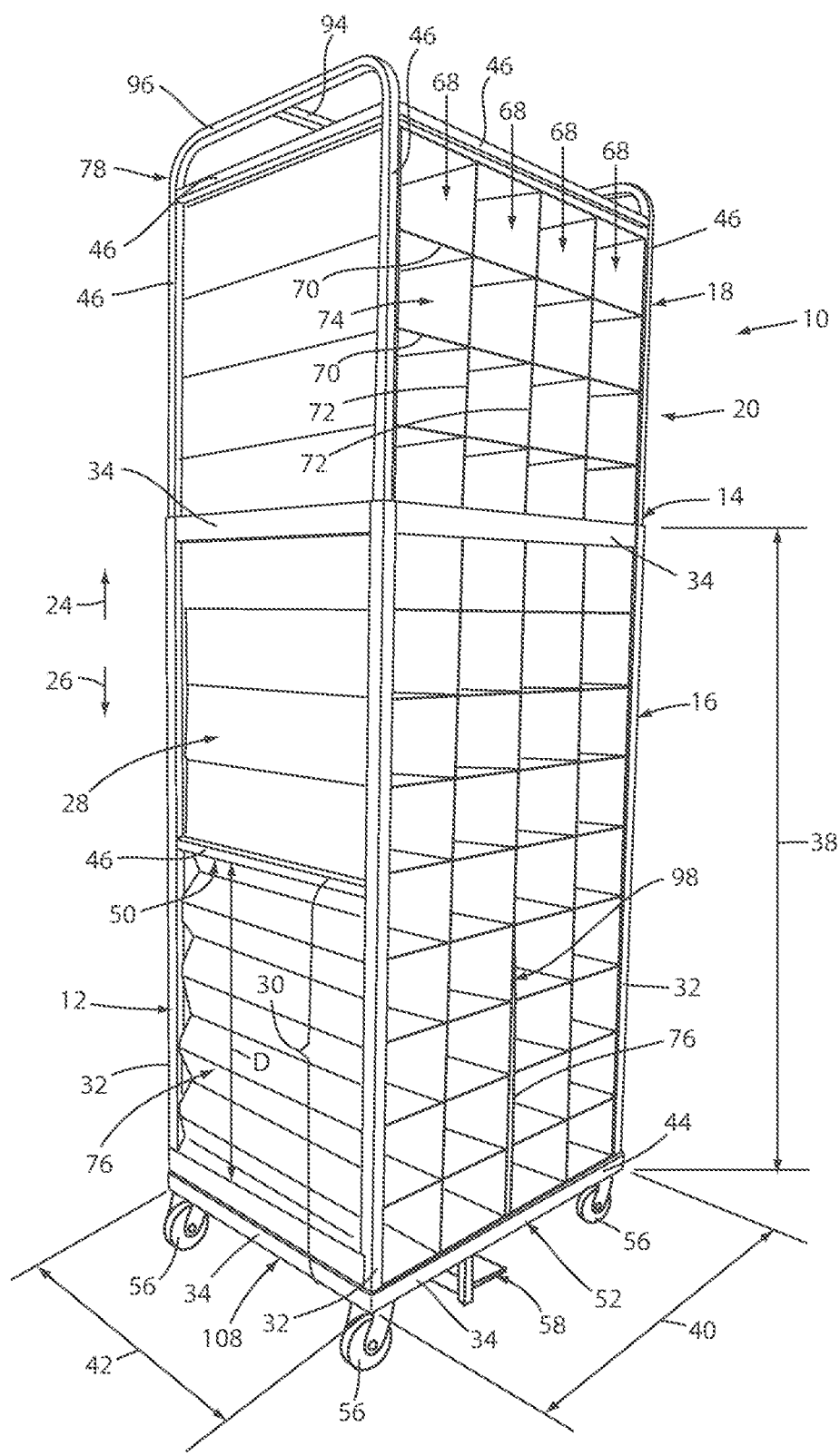
FIG. 1 is a front perspective view of a transportation rack in an extended configuration according to an aspect of the disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the embodiment illustrated in FIGS. 1-13, reference numeral 10 generally designates a transportation rack. The transportation rack 10 includes a base frame 12 configured for resting on a surface and including an open upper side 14 and an open front side 16. The transportation rack 10 further includes an extension frame 18 defining an open front side 20 and being slideably received through the open upper side 14 of the base frame 12. An actuator 22 is coupled between the base frame 12 and the extension frame 18 and is operable to move the extension 18 frame in an extending direction 24 outwardly from the base frame 12 through the open upper side 14 and a collapsing direction 26 inwardly to the base frame 12 through the open upper side 14. The transportation rack 10 further includes a compartment unit 28 supported by the extension frame 18 and having a collapsing portion 30 therealong that accommodates the extending and collapsing of the extension frame 18 with respect to the base frame 12.

Figure 8:
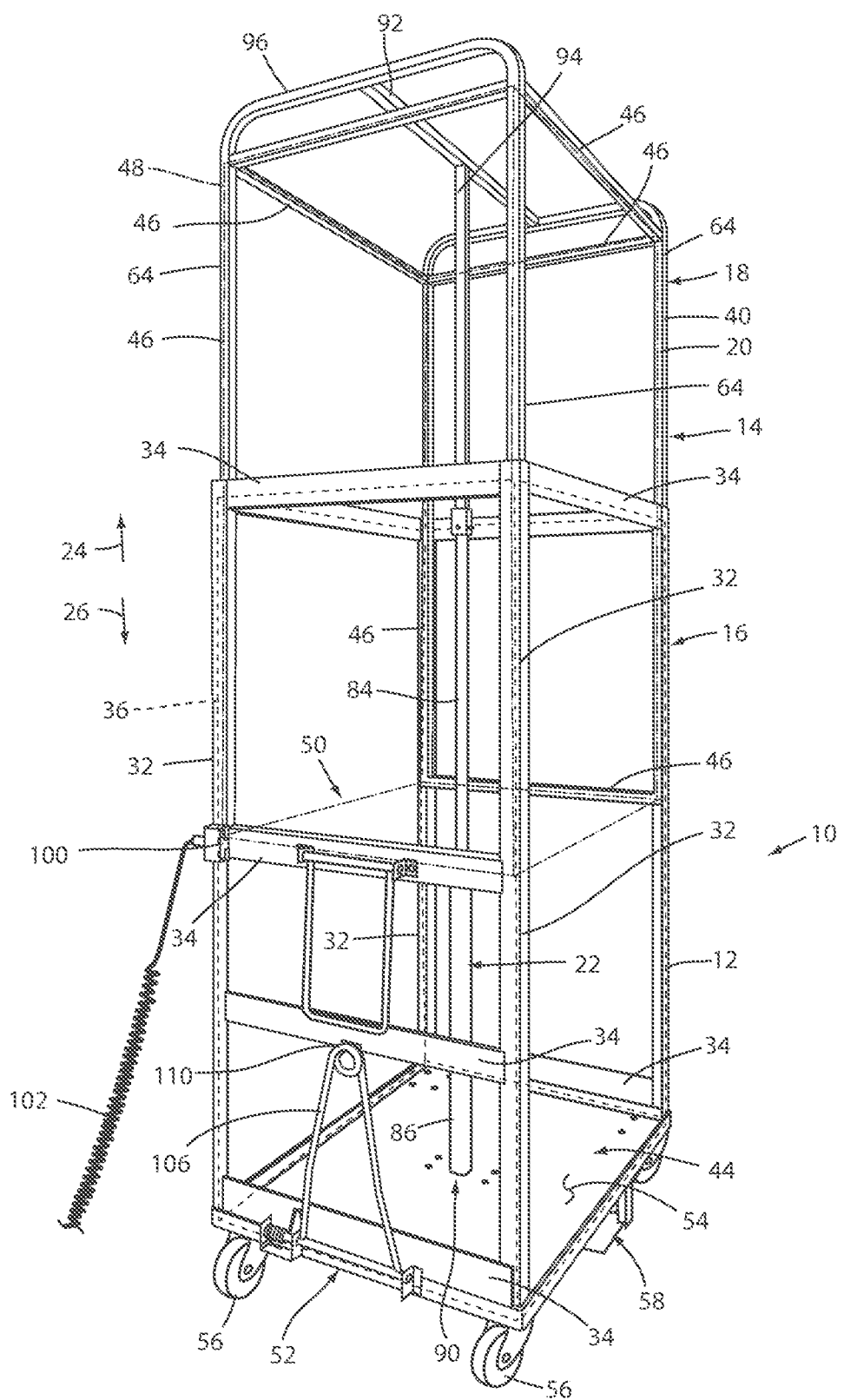
FIG. 8 is a side perspective view of the rack of FIG. 1 in the extended configuration, with a compartment unit thereof removed.

Referring to FIGS. 1-5, the base frame 12 is defined by a plurality of mutually rigidly-coupled first support members 32 and 34 that extend both vertically (vertical first support members 32) and horizontally (horizontal first support members 34) to define a first, open-sided prism 36 (FIG. 8). As shown, the first prism 36 defined by the first support members 32,34 is generally considered a rectangular prism that defines a base height 38, base width 40, and base depth 42. In general, the dimensions (height 38, width 40, and depth 42) of the prism 36 defined by base frame 12 are configured to maximize an accessible storage area within base frame 12, as further described below, while providing for a desired level of mobility of rack 10, as also described further below. In particular, the base frame 12 can be sized to reduce the risk of tipping of base frame 12, such as during movement thereof, for example, while providing base frame 12 with a width 40 that facilitates movement around a factory floor and a depth 42 that allows for a reasonable turning radius of rack 10, including when multiple racks 10 are coupled together in the articulating manner discussed below with respect to FIG. 14.

The particular values of the dimensions 38,40,42 can also vary according to the materials used for construction thereof, including the weight of such materials, as well as the anticipated loading of rack 10. In one example, the height 38 of base frame 12 can be between about 3 feet and 5 feet. In such an example, the width 40 can vary from between about 1.5 feet to 3 feet, and the depth 42 can vary from between about 1.2 feet to 2.5 feet, although the particular dimensions can vary. In the depicted embodiment, the height 38 is about 52", the width 40 is about 36" and the depth 42 is about 24".

Figure 10:
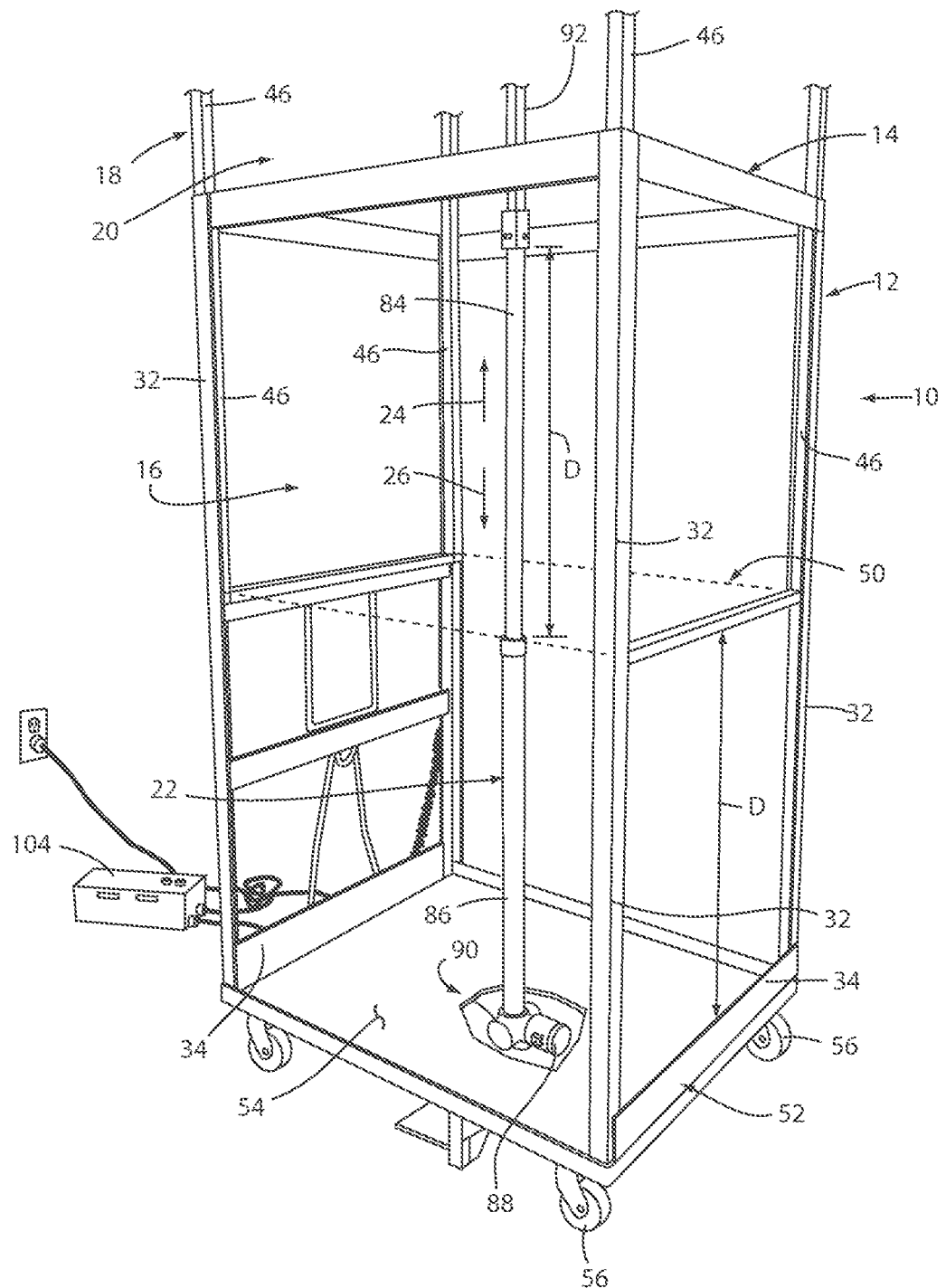
FIG. 10 is a partial cutaway view depicting portions of an actuator associated with the rack.
Figure 11:
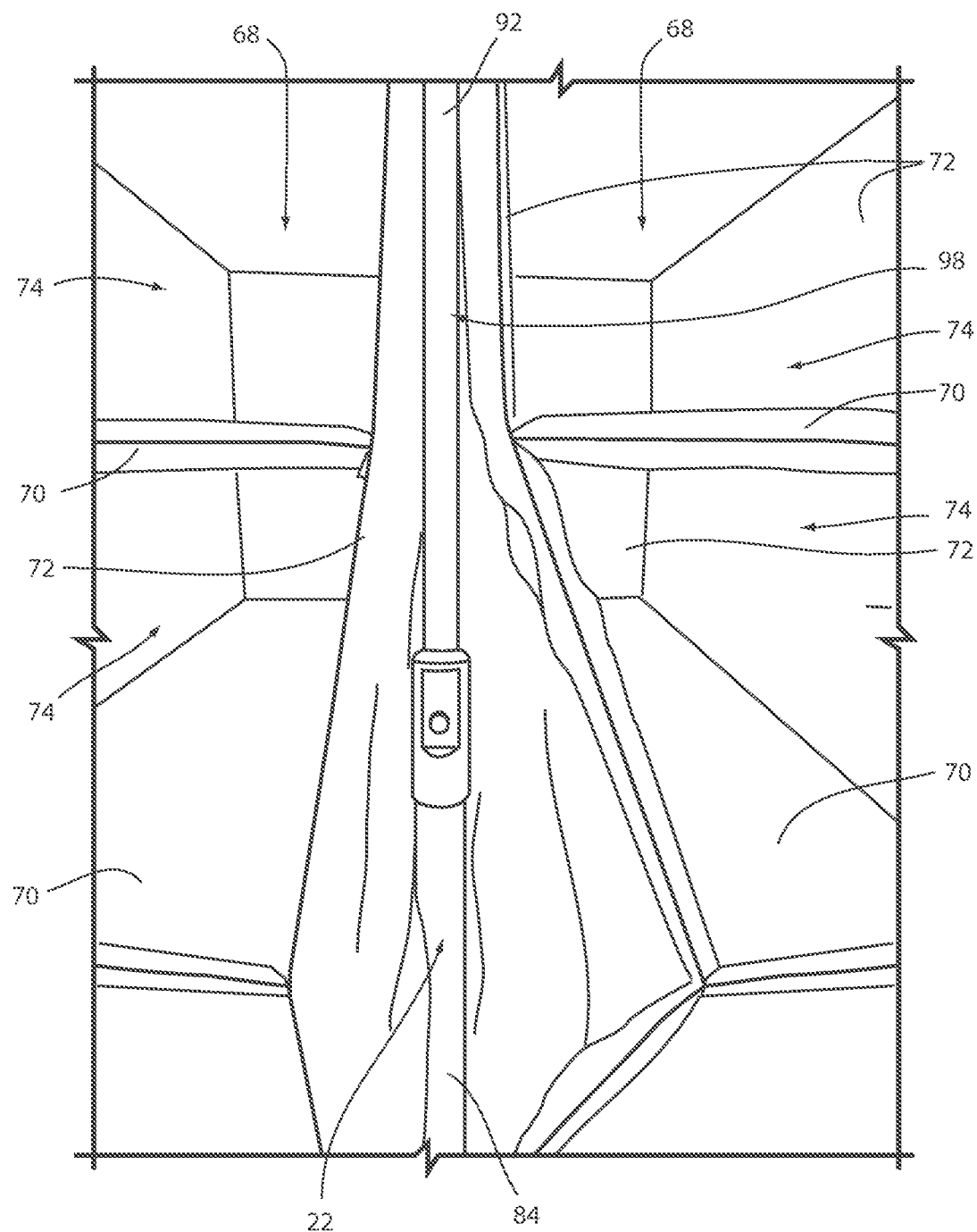
FIG. 11 is a detail view of a portion of the rack of FIG. 1.
Figure 12:
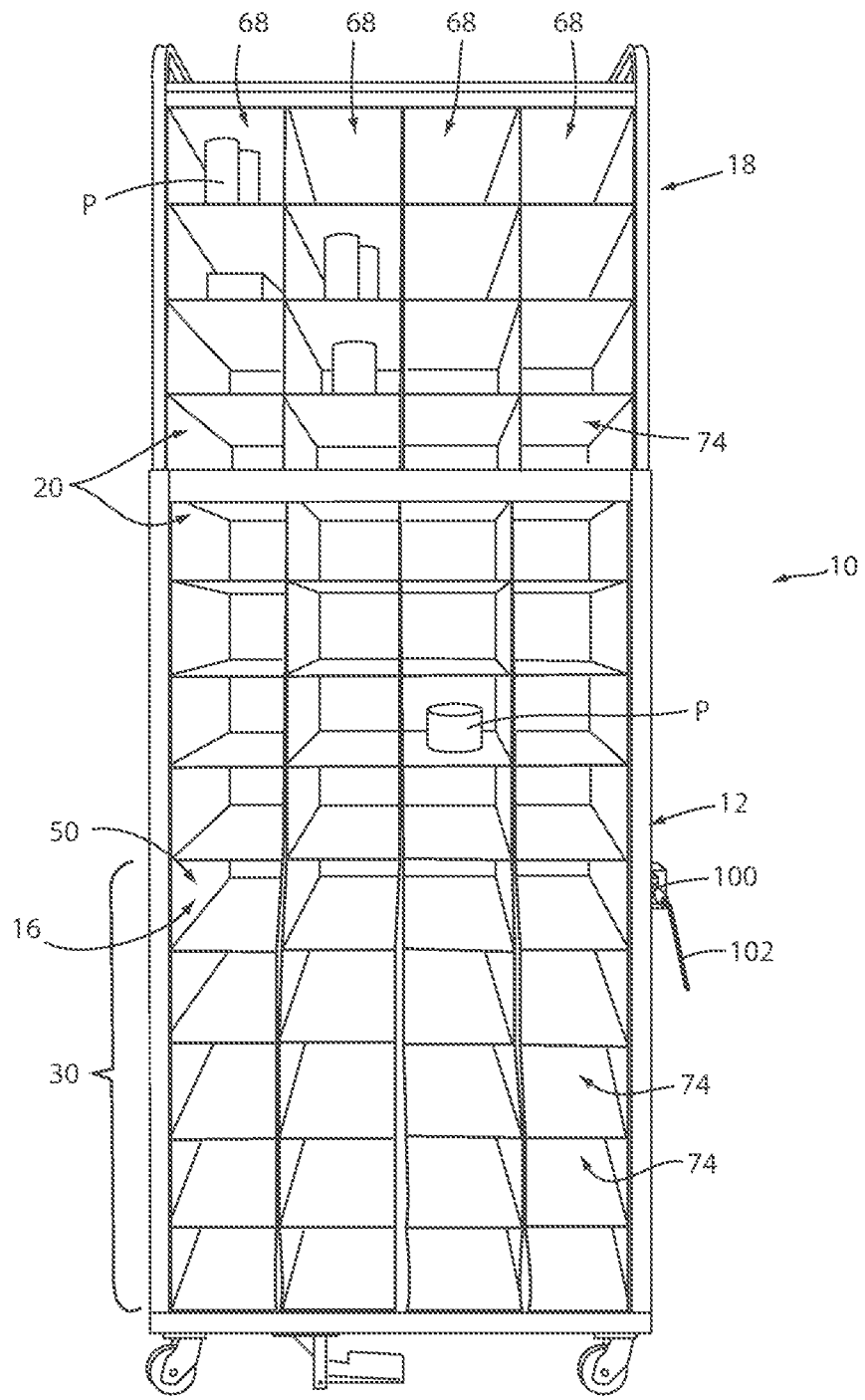
FIG. 12 is a front view of the rack of FIG. 1 in the extended configuration.
Figure 13:
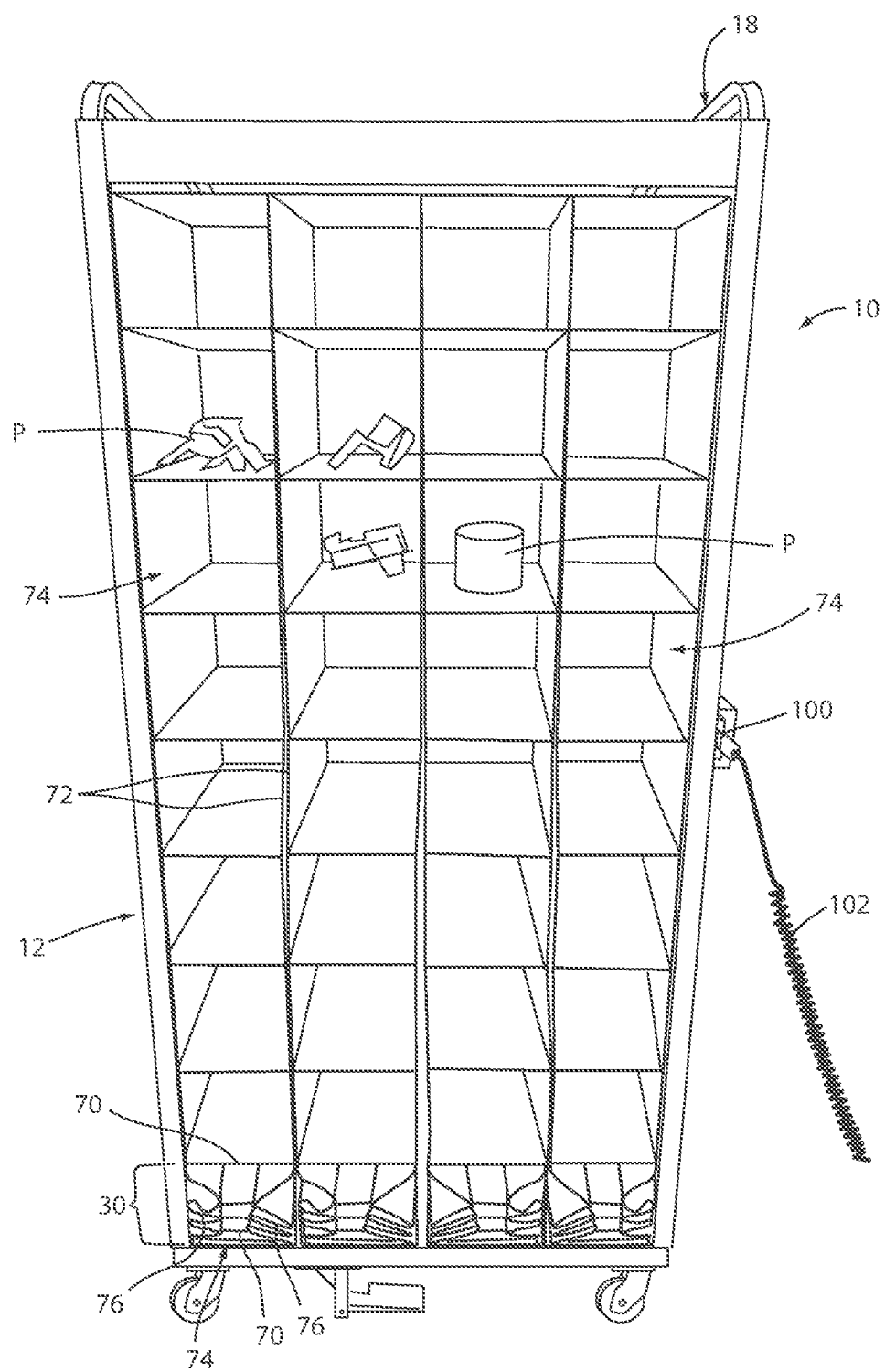
FIG. 13 is a front view of the rack of FIG. 1 in the collapsed configuration.

As further shown in the figures, and in FIGS. 10 and 11, in particular, the first support members 32,34 are arranged such that the base frame 12 is in the shape of the above-described first prism 36, while being generally open-sided. In particular, such an arrangement includes the above-mentioned open upper side 14 and open front side 16 of the base frame 12. As such, the first support members 32,34 can be of a rigid material and can be rigidly joined together to give base frame 12 a desired level of support for both extension frame 18, as described further below, and for at least partial support for compartment unit 28. In particular, first support members 32,34 can be of a metallic material, including steel or the like, that can be of an appropriate thickness to prevent bending or buckling of base frame 12. Further, first support members 32,34 can be welded together (or otherwise coupled together using alternative means including industrial adhesives, or mechanical fasteners such as screws, bolts (with mating threads integrated with relevant portions of rack 10 or corresponding nuts), rivets, or the like) at the various intersections thereof to give the desired shape of prism 36. It is further noted that while horizontal first support members 34 can primarily be used to define the open upper side 14 of base frame 12, as well as the opposite bottom 52 of base frame 12 (or at least a supportive perimeter thereof), additional horizontal first support members 34 can be positioned between the open upper side 14 and bottom side 44 of base frame 12 to provide additional structural support for base frame 12, including resistance to buckling of vertical first support members 32); however, no such horizontal first support members 34 are positioned across open front side 16 or upper open side 14. Additionally, a plurality of horizontal first support members 34 may surround a portion of bottom side 44. In one example, such support members 34 may be positioned on the sides of base frame 12, with the front side 16 and the opposite back side being open, as depicted. In another embodiment, an additional horizontal first support member 34 can be included along bottom side 44 on the back 77 of base frame 12. Such support members 34 can be of varying heights, as needed to provide support for base frame 12, to help maintain collapsing portion 30 of compartment unit 28 within base frame 12 when extension frame 18 is in the lowered position, or other such criteria.

Figure 3:
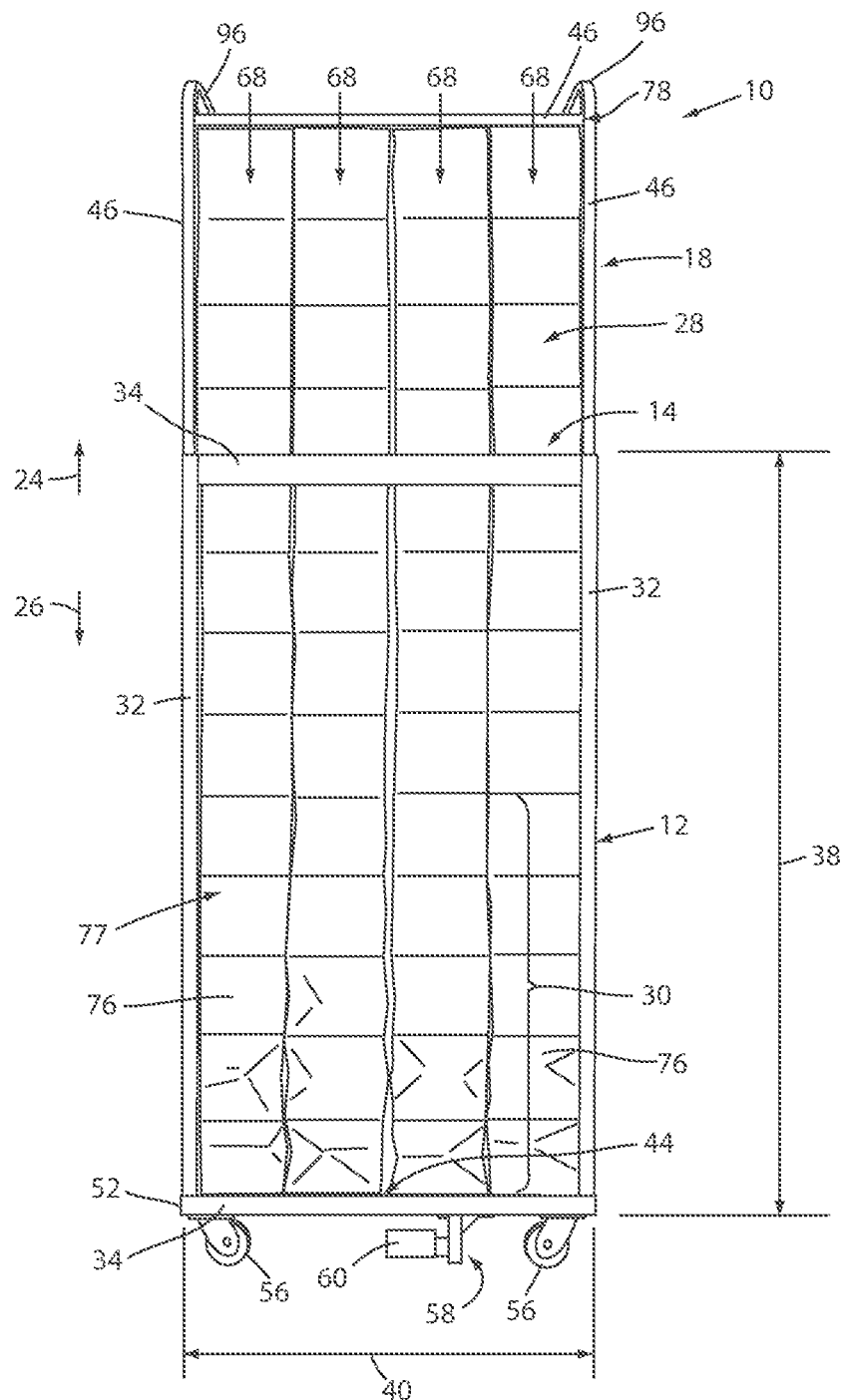
FIG. 3 is a back view of the rack of FIG. 1.
Figure 4:
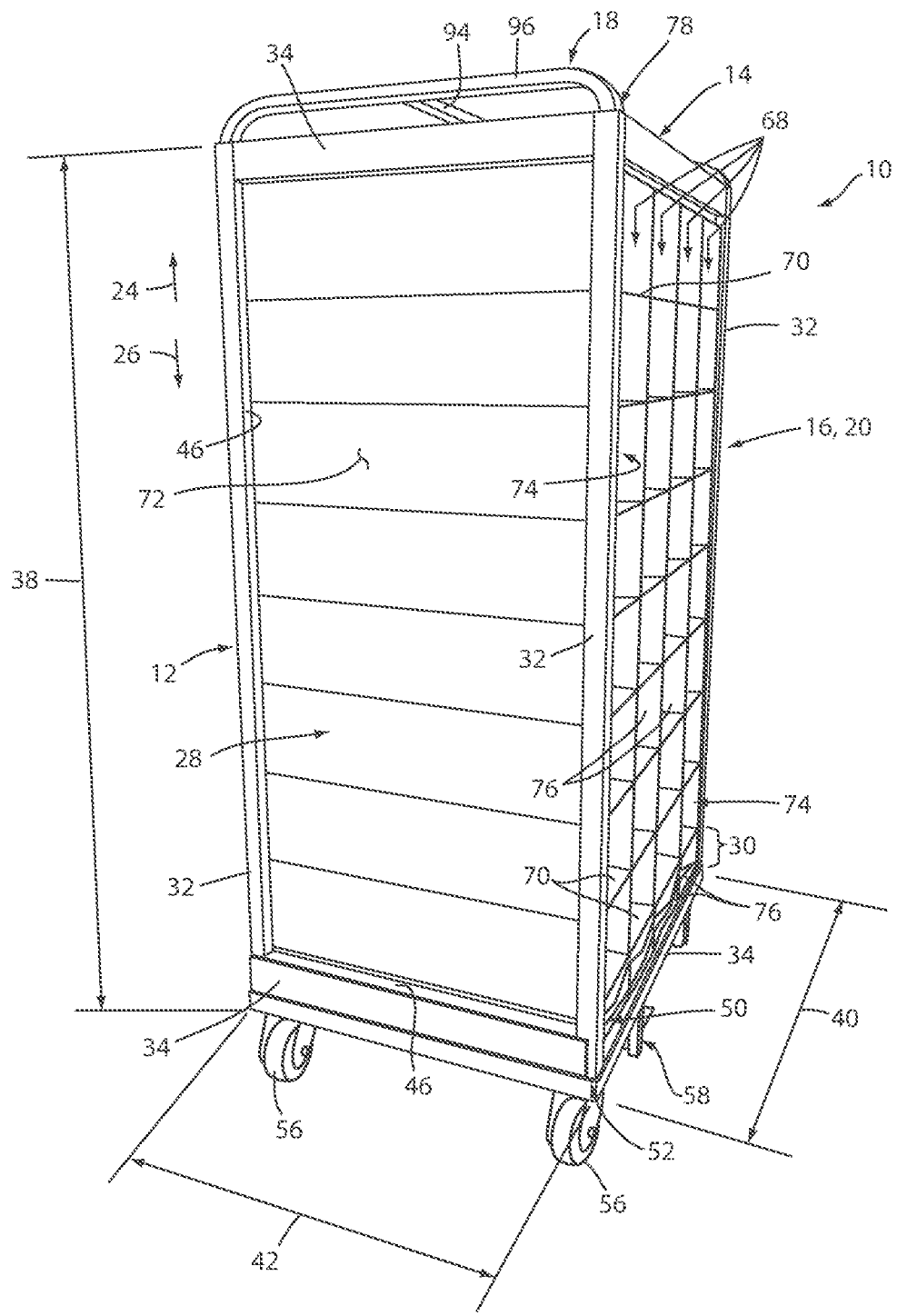
FIG. 4 is a side perspective view of the rack of FIG. 1 in a collapsed configuration.
Figure 5:
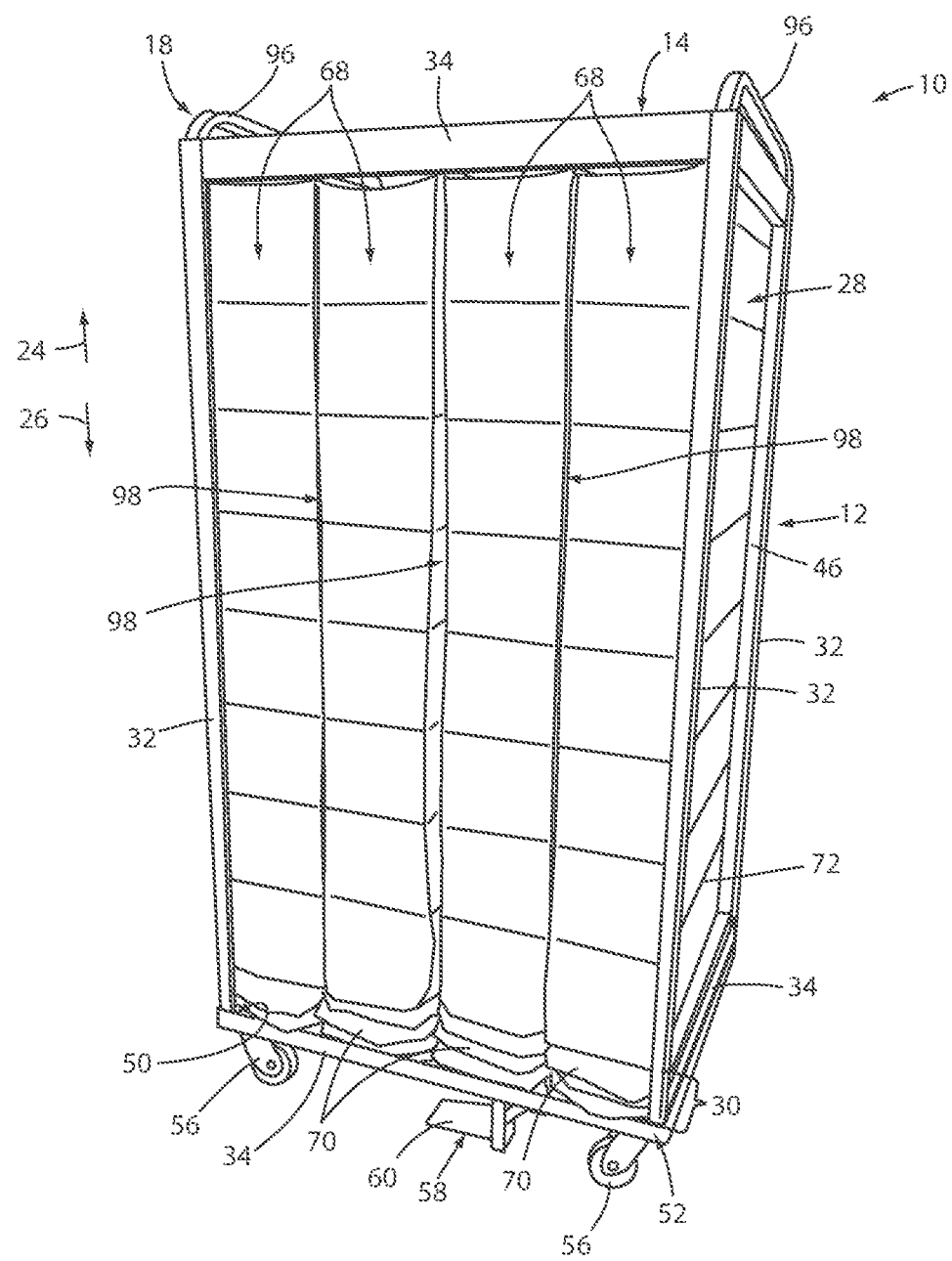
FIG. 5 is a back perspective view of the rack of FIG. 4.

In a similar manner, the extension frame 18 is defined by a plurality of second support members 46 arranged in the general shape of a second prism 48 that is of a generally open construction, including along an open bottom end 50 and the above-mentioned open front side 20 of the extension frame 18. In an embodiment, extension frame 18 can be lacking a second support member 46 along an intersection between open bottom end 50 and open front side 20 such that extension frame 18 is continuously open between open bottom end 50 and open front side 20. The prism 48 defined by extension frame 18 can be a rectangular prism in the same manner as the prism 36 defined by base frame 12 and can be similarly dimensioned but slightly smaller, as described further below, such that extension frame 18 can slidably fit through the open upper side 14 of base frame 12. As further discussed below, the fit of extension frame 18 within base frame 12, including within open upper side 14 thereof, can be sufficient for base frame 12 to support extension frame in the extended position shown in FIGS. 1-3. Additionally, the structure of extension frame 18 can be sufficient to provide a desired level of support for compartment unit 28, under desired loading conditions in both the extended position and the collapsed position (FIGS. 4 and 5). In particular, when in the collapsed position, extension frame 18 may fully rest on a lower surface 54 of the bottom 52 of base frame 12 such that compartment unit 28, including a remaining load thereof, is supported by extension frame 18 on lower surface 54.

Figure 2:
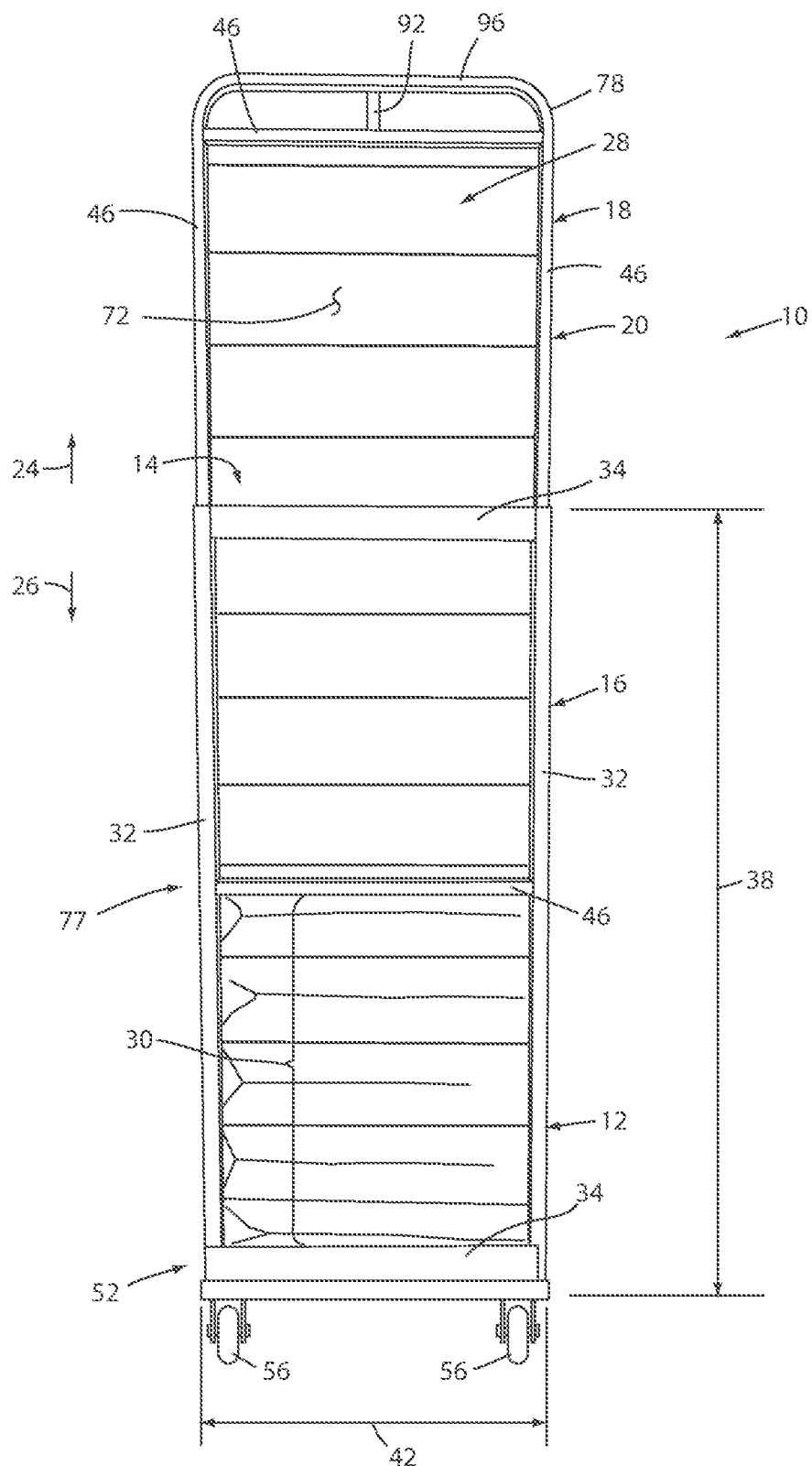
FIG. 2 is a side view of the rack of FIG. 1.

As discussed above, base frame 12 is configured to rest on a surface, which may include the ground, or more specifically, a factory floor or the like. As further discussed, the above-described dimensioning of base frame 12 can be derived to achieve stability of rack 10 on such a surface when extension frame 18 is in both the collapsed position (FIGS. 4 and 5), as well as the extended position (FIGS. 1-3). In some embodiments, however, it may be desirable to add additional supportive elements beneath base frame 12 to provide a measure of stability on an uneven surface or, as desired, mobility for rack 10. As shown in the figures, in the depicted embodiment, such stability and mobility is achieved by coupling wheels 56 to and extending beneath the bottom 52 of base frame 12. Such wheels 56 may be rotating caster assemblies in all instances or on one side with the other side being fixed in direction. In various embodiments, wheels 56 may be coupled to the lower ends of vertical first support members 32, along intermediate portions of desired ones of horizontal first support members or on a lower side of surface 54 (which may be defined by a rigid planar member, such as ⅛" or ¼" steel sheet.

In such an embodiment, a brake mechanism 58 can further be coupled with bottom 52 of base frame 12 to selectively prevent movement of rack 10 by way of wheels. Such a brake mechanism 58 can include a pedal 60 that is generally accessible by a user using his or her foot such that pedal 60 can be depressed to engage or release brake mechanism 58. In various embodiments, brake mechanism 58 can include features to frictionally engage with the surface between wheels 56 and/or to engage directly with wheels 56 to prevent rotation thereof.

Figure 6:
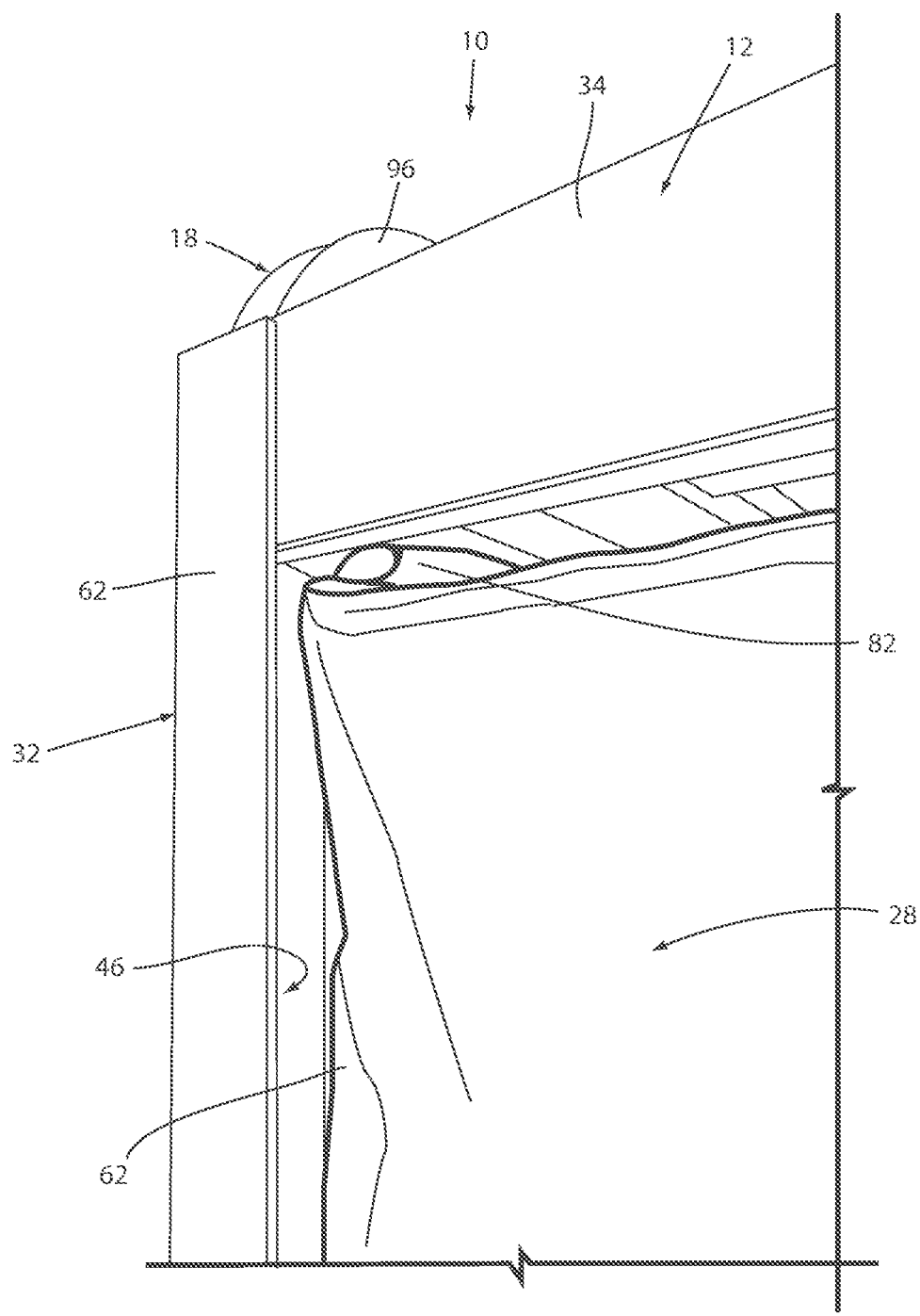
FIG. 6 is a detail view of a portion of the rack of FIG. 4.
Figure 7:
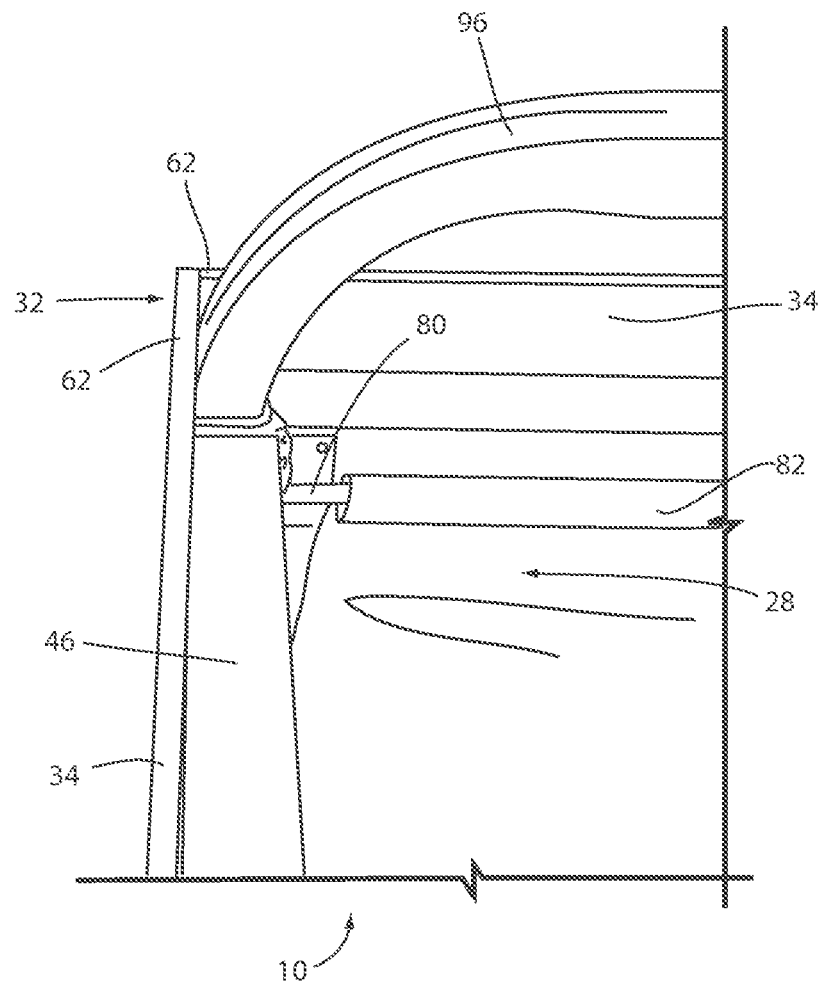
FIG. 7 is a further detail view of the portion of the rack depicted in FIG. 6.

Turning now to FIGS. 6-9, an embodiment of rack 10 is shown in which base frame 12 is constructed with particularly-structured vertical first support members 32 (i.e. that extend in the direction normal to the open top end) that are L-shaped in respective cross-sections thereof. As can be seen in FIG. 7, in particular, the vertical first support members 32 include respective generally planar portions 62 that extend along a longitudinal axis in the direction of height 38 with a material thickness of, for example, between ³⁄₃₂" and ¼" (although other thicknesses are contemplated, depending on the use and application of rack 10). Planar portions 62 can be integrally-formed together (such as in a single L-shaped extrusion) or rigidly affixed together (such as by welding or the like) at a 90° angle to form the desired L-shaped cross section. Further, the horizontal first support members 34 can be single planar members of a desired thickness to provide the above-described supportive characteristics thereof. Accordingly, the difference in the dimension of the overall height 38, width 40, and depth 42 of base frame 12 and the corresponding dimensions of the interior 66 (FIG. 7) of base frame 12 can vary only by the chosen material thickness of first support members 32,34. Such construction allows the similarly-corresponding dimensions of extension frame 18 to be as close as possible to those of base frame 12. In one embodiment, the dimensions of extension frame 18 can be determined by subtracting the material thickness of base frame 12 and a reasonable tolerance (e.g., ¹⁄₁₆" to ⅛") from the dimensions (height 38, width 40, and depth 42) of base frame 12.

Figure 14:
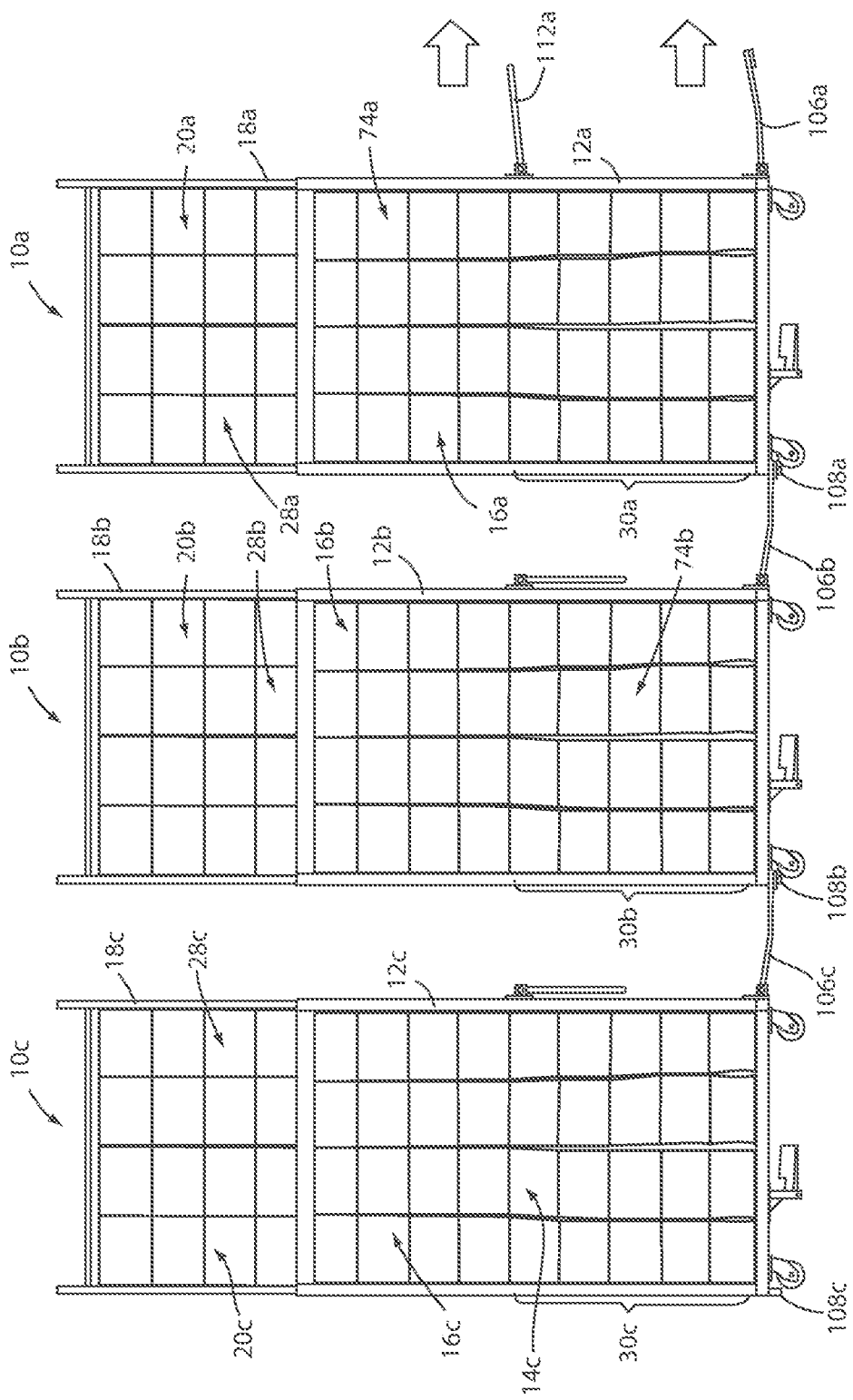
FIG. 14 is a side view of an assembly of multiple racks.
Figure 15:
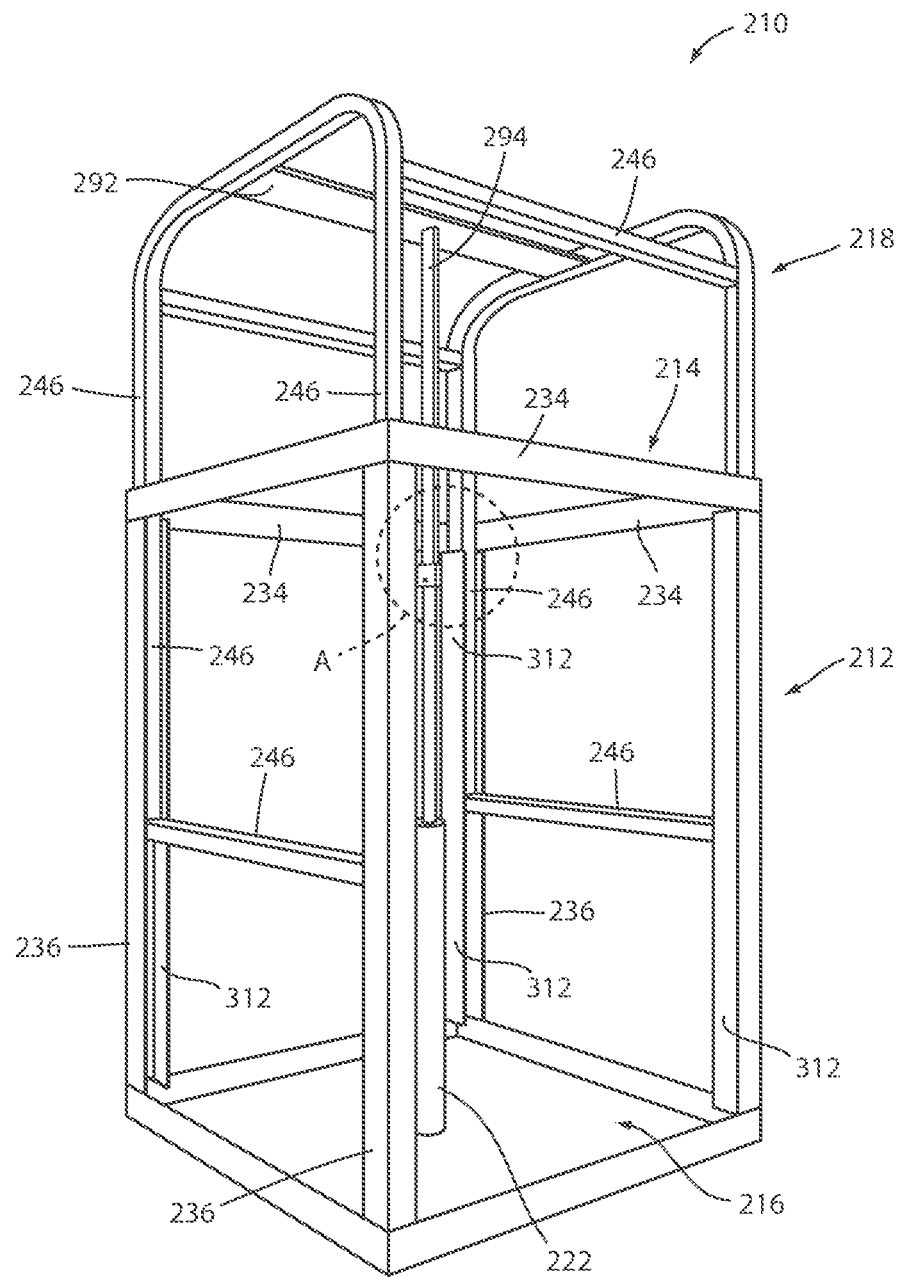
FIG. 15 is a front perspective view of the base frame, extension frame, and actuator of a transportation rack according to an alternative embodiment.
Figure 16:
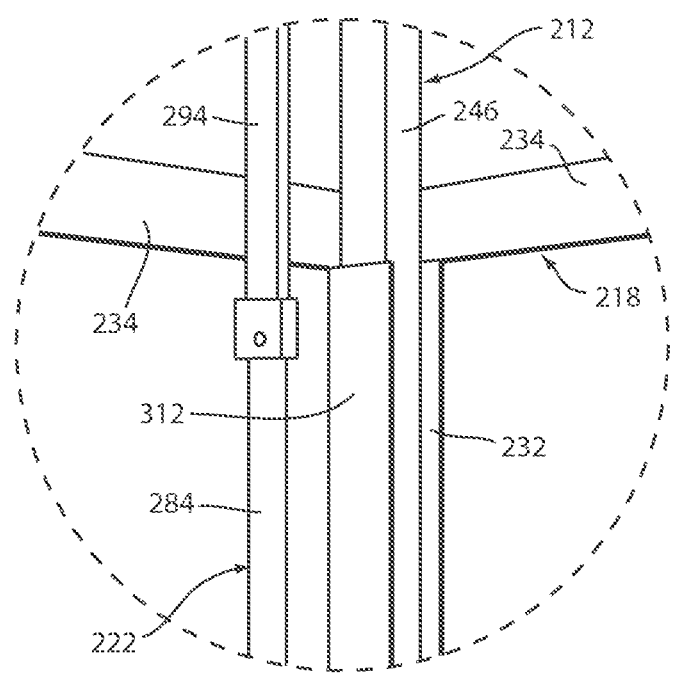
FIG. 16 is a detail view of a portion of the rack of FIG. 15 indicated by area A therein.

As further shown in FIGS. 6 and 7, the vertical first support members 32, constructed as described above, can receive the corresponding vertically-oriented ones of second support members 46 within the respective portions of interior 66 of base frame 12 such that the vertical edges 64 of extension frame 18 are supported the L-shaped cross-sections of the vertical first support members 32. In this arrangement, the planar portions 62 of the vertical first support members 32 can, thusly, overlap the second support members 46 of extension frame 18, which can maximize the area within rack 10 that can be occupied by compartment unit 28, as described further below, and can, further, maximize the area of both the open front side 16 of base frame 12 and the open front side 20 of extension frame 18, thereby maximizing the area through which compartment unit 28 can be accessed by a user through base frame 12 and/or extension frame 18. In a further embodiment depicted in FIGS. 15 and 16, vertical support members 236 of base frame 212 can include an additional interior planar member 312 such that the vertical support members 236 define U-shaped cross sections that can receive the corresponding support members 246 of extension frame 218 therein. In such an embodiment, the U-shaped cross sections of vertical support members 232 may provide additional support for extension frame 218, particularly when in the raised position shown in FIG. 15. It is noted that the operation, use, and possible variations are generally the same as those discussed elsewhere with respect to rack 10, shown in FIGS. 1-14. Further, any additional features not specifically described herein with respect to rack 210, shown in FIGS. 15 and 16, are generally the same as those described elsewhere. In a further variation, both base frame 12 and extension frame 18 can be constructed of tubular members with extension frame 18 sized to fit within base frame 12, accordingly.

Returning to FIGS. 6 and 7, in the depicted embodiment, the second support members 46 can define generally tubular cross sections, such as the depicted rectangular cross sections, which may be hollow, to provide an increased resistance to bending and reduced weight. Further, such construction can allow for a smaller or more narrow cross-section than possible by way of the flat and L-shaped cross-sections of the first support members 32,34, which facilitates the above-described overlapping arrangement of second support members 46 with first support members 32, 34.

Returning now to FIGS. 1-6, the compartment unit 28 is described in greater detail. In particular, compartment unit 28 includes an arrangement of flexible fabric columns 68. The columns 28 can be defined by lengths of fabric folded into U-shaped sections. In particular, the fabric can be a polymer-coated textile sheet, including vinyl fabric or the like. In this manner, the fabric lengths can define facing sections 72 thereof extending through the height of compartment unit 28. In particular, a number of such folded fabric sections 72 can be included to correspond with a desired number of columns 68, including four, for example, as depicted in the figures, although more or fewer columns 68 can be included, as desired depending on the needs of the user and the construction of rack 10, as described herein. The columns 68 can be affixed together or separately assembled with extension frame 18, as discussed below. The columns 68 can further include a plurality of horizontal members 70 coupled therein between the facing fabric sections 72 such that horizontal members 70 can maintain the fabric sections 72 in the depicted facing arrangement within the overall U-shaped configuration described above. Further, the horizontal members 70 can define a corresponding plurality of compartments 74 within columns 68 and within compartment unit 28, overall. The compartments 74 can be used to retain and transport various parts P (FIGS. 10 and 11) or components via rack 10 to a desired assembly area, for example. In this manner, horizontal members 70 can be generally rigid so as to support the weight of various items thereon without causing deformation of the columns 68. In an embodiment, horizontal members 70 can include cardboard, wood, or plastic sheets covered with fabric, such as nylon, vinyl fabric or the like, which can be sewn to the facing fabric sections 70 (along with an intermediate rear section extending between the facing fabric sections 70). The horizontal members 70 can be spaced at regular or varying intervals along columns 68 to achieve the desired configuration of compartments 74. In this manner, a plurality of flexible side walls 76 of each compartment 74 are defined by the sections 72 of fabric between the horizontal members 70. In a variation of the depicted embodiment, the columns 68 may be approximately half of the depicted dimension along the depth 42 of rack 10. Such columns 68 may be adjacent to and accessible through open first side 16 of base frame 12 in a manner similar to those depicted in FIGS. 1-6. In this manner, additional half-depth columns may be included in compartment unit 28 adjacent to and accessible through open second side 77 of base frame 12 opposite open first side 16. Such a configuration can allow a single rack 10 to provide parts or the like to different adjacent stations in an assembly line.

As shown in FIGS. 4 and 5, the flexible nature of compartment unit 28 in the extending 24 and collapsing directions 26, by way of the above-described fabric construction of columns 68, accommodates the extending and collapsing of the extension 18 frame with respect to the base frame 12. In particular, as can be seen with additional reference to FIGS. 8 and 9, movement of extension frame 18 with respect to base frame 12 by operation of actuator 22 (described further below) moves extension frame 18 in its entirety with respect to base 12 and, in particular, through the open upper side 14 of base frame 12 such that, when extended, the bottom end 50 of extension frame 18 is spaced apart from the lower interior side 44 of base frame 12 by an extension distance D that also corresponds to the distance by which extension frame 18 extends outward from open upper side 14 of base frame 12. In such a condition, compartment unit 28, which is supported by rack 10 by being coupled with extension frame 18 adjacent the upper end 78 thereof, extends downwardly through the height of extension frame 18 and out of the open bottom end 50 thereof to a position in contact with or adjacent (e.g., within about 3") of lower interior side 44 of base frame 12. In this manner, the absence of a second support member 46 between open bottom end 50 and the open front side 20 of extension frame 18 removes a potential obstruction of any compartments 74 that align with the open bottom end 50 of extension frame 18.

As shown in FIG. 5, when actuator 22 operably lowers extension frame 18 in the collapsing direction 26, the open bottom end 50 of extension frame 18 moves toward and into contact with, or at least adjacent to, lower interior side 44 of base frame 12, thus closing the gap present therebetween in the extended condition. During such movement, the flexible side walls 76 of the compartments 74 located between the open bottom end 50 of extension frame 18 and the lower interior side 44 of base frame 12, which roughly defines the above-mentions collapsing portion 30 of compartment unit 28, can bend or fold to allow the compartments 74 in the collapsing portion 30 to collapse by the adjacent horizontal members 70 moving closer together, thereby shortening the height of compartment unit 28 to the retracted length of rack 10, which closely corresponds with the height 38 of base frame 12. Such collapsing can occur due to the weight of the remaining portion of compartment unit 28 above the collapsing portion 30 against the lower interior side 44 of base frame 12, which can be furthered by the compartments 74 in the remaining portion being occupied by parts P and, accordingly, bearing weight against the compartments 74 in collapsing portion 30.

As can be seen in FIG. 11, for example, the compressed compartments 74 within the collapsing portion 30 still occupy some vertical space within rack 10 when extension frame 18 is in the collapsed position. In one example, such space may be approximately equal to that of one non-collapsed compartment 74. Accordingly, the number of compartments 74 in the vertical direction, as well as the distance D that extension frame 18 travels may be configured to accommodate this space within extension frame 18.

It is noted that in the present embodiment, the entire compartment unit 28 can be generally uniform in construction in the extending 24 and collapsing 26 directions such that the entire compartment unit 28 can be capable of collapsing (which can provide for easy shipping and storage of compartment unit 28). In this embodiment, the portion considered the collapsing portion 30 is, as described above, the portion that extends between the open bottom end 50 of extension frame 18 and the lower interior side 44 of base frame 12 when extension frame 18 is in the extended position. Accordingly, when lowering extension frame 18, some degree of collapsing of compartments 74 outside of the collapsing portion 30 may occur during lowering of extension frame, particular when such compartments 74 are unoccupied.

In a further variation of the depicted embodiment, rack 10 may include separate upper and lower portions of compartment unit 28 with the lower portion of compartment unit corresponding with the illustrated collapsing portion 30 and the upper portion including the remaining portion thereof. In such a variation, the lower portion may be made of additional columns 68 affixed on bottom end 50 of extension frame 18, such as by including additional support members 46 in the direction of the width of rack 10. In this manner, the columns 68 of the lower portion of compartment unit 28 can be mounted to bottom end 50 in a manner similar to that shown in FIG. 7. In such a configuration, the columns 68 in the upper portion can be shorter versions of the depicted fabric columns 68 or could include rigid bodies of plastic, metal or the like (with a channel therein to accommodate actuator 22). The lower columns 68 can, similarly, be shorter variations of the columns 68 depicted herein. In a still further variation, rack 10 can be used without compartment unit 28 or with only an upper portion of the compartment unit 28, as described above. In such a variation, items can be stacked or otherwise placed on surface 54 of base frame 12 when the extension frame 18 is in the raised position. Once such items have been removed, extension frame 18 can be lowered for access to items stored therein (such as by being included within a shortened compartment unit 28 or on a shelf or other surface extending over bottom end 50 of extension frame 18).

In the illustrated embodiment, the compartment unit 28 may be comprised of a number of individual columns 68, as described above, that may be independently mounted to extension frame 18. In particular, each such column 68 may include a pair of open loops 82 on the uppermost portion thereof (FIG. 7) that extend in the direction of the depth 42 of base frame 12. A corresponding pair of mounting rails 80 may extend through the loops 82 and couple with opposite second support members 46 that define a top end 78 of extension frame 18. The mounting rails 80 may fit into slots in such second support members 46 that are open only on the upper side thereof to allow the rails 80 to drop into the slots and to be retained therein by the weight of the associated column 68. In other arrangements, mounting rails 80 may screw or bolt into the associated second support members 46. In other embodiments, the columns 68 may be coupled together in an integral compartment unit 28 such that the entire compartment unit 28 is assembled to and disassembled from extension frame 18 in a single assembly.

With reference to FIGS. 8-11, the actuator 22 is described in greater detail. In particular, the actuator 22 may be a linear actuator having a piston 84 extendable from a housing 86. In the present embodiment, the piston 84 may be driven by an internal power screw arrangement (both housing 86 and piston 84 being hollow to accommodate the screw portion with at least a portion of the interior of piston 84 being threaded such that rotation of the screw drives linear motion of the piston 84 in the extending 24 or collapsing direction 26, depending on the direction of rotation. In turn, the actuator 22 may include an electric motor 88 to drive rotation of the screw (either directly or by a reduction mechanism therebetween). To achieve the desired travel of extension frame 18, the actuator 22 is configured such that piston 84 has an extendable length equal to distance D. In other embodiments, actuator 22 may be a hydraulic or pneumatic actuator with appropriate assemblies for driving linear movement of such actuators being mounted beneath surface 54 of base frame 12.

As shown in FIG. 10 the actuator 22 can be mounted to base frame 12 along a central portion 90 of the substrate defining lower surface 54 of base frame 12. In this manner, housing 86 may be positioned beneath surface 54 to avoid interference with compartment unit 28. Opposite from the mounting with base frame 12, actuator 22 couples with extension frame 18 by way of an extension arm 92 that couples on one end thereof with the free end of piston 84 and on the other end thereof with an upper cross member 94 of extension frame 18. The extension arm 92 essentially occupies the vertical distance between actuator 22 and the top end 78 of extension frame 18, as actuator 22 has a height of approximately the extension distance D. As further shown, cross member 94 can generally bisect extension frame 18 along the width of rack 11 and can have extension arm 92 coupled therewith at the midpoint thereof such that actuator 22 may be centrally positioned with respect to both extension frame 18 and base frame 12. This configuration provides for balancing of extension frame 18 by actuator 22 and extension arm 92 during lifting of extension fame 18 and when maintaining extension frame 18 in the elevated position. As further shown, cross member 94 may be spaced above the top end 78 of extension frame 18 by a pair of upper frame members 96 that extend vertically above the second support members 46 to which compartment unit 28 is mounted. Such construction allows for access to mounting rails 80 during assembly and disassembly thereof with extension frame 18 and, further, provides for additional height of rack 10 to accommodate the coupling of extension arm 92 with piston 84 and with cross member 94.

To accommodate the central positioning of actuator 22, compartment unit 28 may define a channel 98 therein that corresponds with the location of actuator 22. As shown in FIG. 11, the channel 98 of the depicted embodiment can be a gap present between adjacent columns 68 by way of the separate construction and mounting of the adjacent columns 68, although other arrangements are contemplated. In such an embodiment, the overall number of columns 68 is even such that one of the channels 98 between the successive columns 68 aligns with actuator 22. In a variation where an odd number of columns 68 is desired, actuator 22 can be offset from the center of lower surface 54 to align with one of the channels 98 between such columns 68. Additional actuators 22 can be included in such a rack 10 in additional channels 98 to balance the force applied to extension frame 18 and/or to provide additional lifting force therefore. Such additional actuators 22 can be included in further variations of rack 10 with an increased width 40, regardless of whether an even or odd number of columns 68 are present, to provide additional force distribution and/or lifting force for larger variations of rack 10 that what is presently depicted.

As further shown in FIG. 10, rack 10 can include an electrical coupling 100 mounted externally on the base frame 12 (such as by being fixedly coupled on one of the first support members 32,34. Electrical coupling 100 is, in turn, electrically connected with the electric motor 88 of the actuator 22. In this manner, an external control unit 104 can be connected to actuator 22 by way of coupling 100 for providing directional control of motor 88 to operate actuator 22. Such an assembly allows the control unit 104, which may be somewhat bulky, to be positioned in a location (e.g., a station on an assembly line) where one or more racks 10 may be used, including in groups, as discussed further below. In such an arrangement, the control unit 104 may be connected with a particular one of such racks 10 for which movement of extension frame 18 is desired. Because such movement may occur generally infrequently and may be coordinated with the need to move additional extension frames 18 of other racks 10, a cost and/or weight saving may be realized by associating control units 104 with stations, rather than individual racks 10. In this manner, control unit 104 can be decoupled from electrical coupling 100 and reconnected with the coupling 100 of another rack 10, when needed. Such use can also allow control unit 104 to be coupled with other safety interlock devices, such as foot pedals, or the like, to require a user to be safely positioned away from rack 10 prior to movement of extension portion 18. Alternatively, coupling 100 may be replaced by a control unit 104 directly mounted to rack 10 and directly coupled with motor 88.

Figure 9:
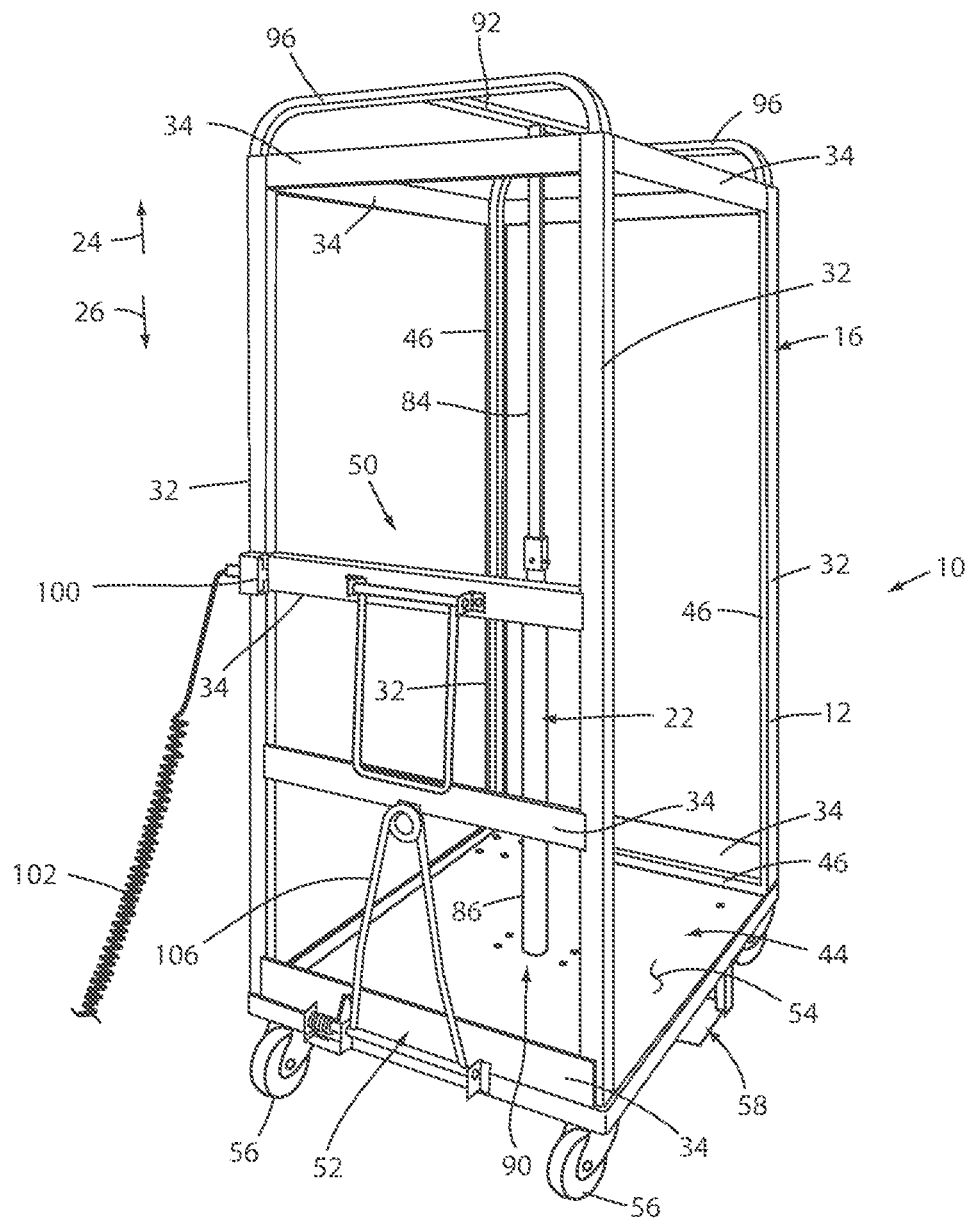
FIG. 9 is a side perspective view of the rack of FIG. 8 in the collapsed configuration.

As shown in FIGS. 9 and 10, the base frame 12 may further include a coupling extension 106 mounted on one side thereof and a hitch member 108 mounted on a side opposite the side to which coupling extension 106 is mounted. The coupling extension 106 and hitch member 108 can be configured for mutual engagement such that, as shown in FIG. 14, adjacent racks 10a,10b can be coupled together by attachment of the coupling extension 106a of one rack 10a with the hitch member 108b of another rack 10b. As illustrated, hitch member 108 can be a generally straight post mounted in a downwardly-extending manner beneath one of the horizontal first support members 34 defining the bottom 52 of base frame 12. In such an arrangement, coupling extension 106 can include a looped portion 110 on a free end thereof through which the hitch member 108 can be received. Further, the coupling extension 106 can be spring-biased toward the retracted position shown in FIG. 10 to provide automatic retraction thereof when decoupled from hitch member 108. Further, in such an arrangement, the biasing of coupling extension 106 can maintain loop 110 in an engaged position with hitch member 108 due to the downward orientation thereof, which is such that the biasing of coupling extension 106 is maintained against the horizontal first support member 34 from which hitch member 108 extends. Other variations of both hitch member 108 and coupling extension 106 are possible, including an arrangement where hitch member 108 extends upward relative to lower end 52 of base frame 12 with coupling member being biased downwardly or being unbiased such that gravity maintains engagement with hitch member 108. Further, hitch member 108 may be hooked or arced, may be a ball, or may be otherwise shaped according to known variations in such elements, with coupling member being configured for engagement therewith. Base frame 12 may further have a handle 112 coupled therewith to allow for manual movement of rack 10.

The coupling of multiple racks 10a and 10b together, as described (which can also achieve coupling of racks 10b and 10c) can allow multiple racks 10 to be configured with the respective extension frames 18 in the elevated position and loaded with parts P in a single location (e.g., a warehouse or the like). Such parts P can be those needed at a particular station or adjacent stations in part of a line for designated portion of assembly of a product or a series of products, components, subassemblies, or the like (such as an automotive component, for example), allowing the assembled racks 10a,10b,10c to be towed, manually by an individual or using a designated vehicle, to the location where the parts P are needed. Once appropriately located, the parts P from the accessible portions of racks 10a,10b,10c can be unloaded from the compartments 74 during assembly in that particular area. The accessible portions of the racks 10a,10b,10c can be the compartments 74 located within the open front side 16 of base frame 12, for example. When the compartments within either the collapsing portion 30a of the accessible area (e.g., open front side 16a) of a first rack 10a are empty, the rack 10a can be coupled with the control unit 104 of the associated assembly area for lowering of the extension frame 18a, thereby giving access to the previously inaccessible compartments 74. In this manner, the parts P within the racks 10a can be removed successively, first within the accessible area of the collapsing portion 30a, then within the remaining compartments 74a after lowering of the extension portion 18a. Once the first rack 10a is empty, the parts P in the next rack 10b can be removed in a similar manner, followed by the parts P in rack 10c. In various embodiments, three or more racks 10 can be coupled together and towed to an assembly location. In some embodiments, up to five racks 10 can be coupled together and towed (although more than five racks 10 can coupled and towed in some configurations). In such an embodiment, in the depicted configuration of compartments 74, the addition of the collapsing portion 30 to compartment units 28 can allow for the addition of sixteen compartments 74 per rack 10, which is an increase of over 40% from a comparable non-extendable rack. When coupling five racks 10 together, an extra eighty compartments 74 can be included in a single "train" of racks 10, which can reduce the frequency with which racks 10 need to be swapped out for reloading.

In this manner, a method for providing parts P to a production line (including a portion thereof) can include transporting an assembly of coupled racks 10, as discussed above and shown in FIG. 14, to the assembly location. Various ones of the parts P can then be selectively removed from a lower section, either collapsing portion 30a or the entirety of open front side 16a of base 12a, of the compartment unit 28a of the first of the assembly of racks 10a through an open front side 16a of the base frame 12a. When the parts P have been removed from the lower section (collapsing portion 30a or the entirety of open front side 16a), the control unit 104 can be used to cause the actuator 22a in the first rack 10a to lower the extension frame 18a through the open upper side 14a of the base frame 12a. In this manner, the control unit 104 can be coupled with the electrical coupling 100a of rack 10a before or after unloading of the lower area thereof. As discussed above, the collapsing portion 30a of the compartment unit 28a collapses to accommodate the lowering of the extension frame 18a. Subsequently, parts are removed from the upper portion 112a of the compartment unit 28a through the open front side 16a of the base frame 12a and through the open front side 20a of the extension frame 18a. Subsequently, parts P can be removed from successive racks (e.g., racks 10b and 10c) in a similar sequence with control unit 104 being decoupled from an empty rack (e.g., rack 10a) and coupled with the next rack (e.g., rack 10b). As discussed above, such a sequence can include up to 5 racks 10 or more coupled together and transported to the assembly line or portion thereof.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. An adjustable rack assembly, comprising:
a base frame defining an upper end and an open front side;
an extension frame defining an upper end, a bottom end and an open front side, the extension frame being slidably mounted to the base frame;
an actuator coupled between the base frame and the extension frame and operable to move the extension frame between a collapsed position, in which the top end of the extension frame is adjacent to the top end of the base frame, and an extended position, in which the top end of the extension frame is moved away from the top end of the base frame and the bottom end of the extension frame is moved toward the top end of the base frame; and
a compartment unit supported by the interior frame and being at least partially collapsible to accommodate the movement of the extension frame between the collapsed position and the extended position.

2. The adjustable rack assembly of claim 1, wherein the upper side of the base frame is open to receive the extension rack therethrough.

3. The adjustable rack assembly of claim 1, wherein:
the lower end of the extension frame is open; and
the compartment unit extends through the open lower end of the extension frame when the extension frame is in the extended position.

4. The adjustable rack assembly of claim 3, wherein the open bottom end of the extension frame is continuously open to the open front side of the extension frame.

5. The adjustable rack assembly of claim 1, wherein:
the base frame includes a plurality of first support members arranged in a first prism; and
the extension frame includes a plurality of second support members arranged in a second prism.

6. The adjustable rack assembly of claim 5, wherein the second prism is sized to fit within the first prism.

7. The adjustable rack assembly of claim 1, wherein the actuator is mounted with the base frame adjacent a center of a bottom side of the base frame and oppositely couples with a cross member bisecting a top side of extension frame.

8. The adjustable rack assembly of claim 1, wherein the actuator is a linear actuator driven by an electric motor.

9. The adjustable rack assembly of claim 1, wherein the actuator is a hydraulic actuator.

10. The adjustable rack assembly of claim 1, wherein the compartment unit includes an arrangement of flexible fabric columns with rigid horizontal members spaced at vertical intervals along the columns.

11. The adjustable rack assembly of claim 10, wherein the compartment unit accommodates the extending and collapsing of the extension frame with respect to the base frame by portions of fabric ones of the plurality of rigid members within the collapsible portion folding to allow ones of the rigid members to move closer together with movement of the extension frame to the collapsed position.

12. The adjustable rack assembly of claim 1, wherein the base frame is configured to rest on a surface by defining a generally planar lower end having a plurality of wheels coupled therewith.

13. The adjustable rack assembly of claim 1, wherein the open front side of the extension frame is aligned with the open front side of the base frame when the extension frame is in the collapsed position.

14. A transportation rack, comprising:
a base unit configured for resting on a surface and including a lower interior side and an upper side;
an extension unit slidably mounted with the base unit and defining an upper member coupled on an upper end of the extension unit;
means for automatically driving movement of the extension unit relative to the base unit, such movement including in an extending direction, wherein the upper end of the extension unit moves away from the upper side of the base unit, and in a collapsing direction, wherein the upper end of the extension unit moves toward the upper side of the base unit; and
a compartment unit supported by the extension unit and having a collapsible portion therealong that accommodates the extending and collapsing of the extension unit with respect to the base unit, the compartment unit defining a channel therethrough to receive the means for automatically driving movement, wherein:
the compartment unit includes an arrangement of flexible fabric columns with rigid horizontal members spaced at vertical intervals along the columns; and
the compartment unit accommodates the extending and collapsing of the extension unit with respect to the base unit by portions of fabric ones of the plurality of rigid members within the collapsible portion folding to allow ones of the rigid members to move closer together in the collapsing direction.

15. The transportation rack of claim 14, wherein:
the base unit is a base frame including a plurality of first support members defining a first prism wherein the upper end and a front side between the upper side and the lower interior side are generally open; and
the extension unit is an extension frame including a plurality of second support members defining a second prism wherein the bottom end and a front side thereof are generally open.

16. A method for providing parts to a production line, comprising:
selectively removing parts from a lower section of a compartment unit of a rack, the rack including a base unit defining an upper end and an extension unit slidably mounted with the base unit, the lower section of the compartment having an expanded height and being accessed through an open front side of the base unit;
when the parts have been removed from the lower section, lowering the extension unit with respect to the base unit, the compartment unit partially collapsing by reduction of the lower section of the compartment unit to a collapsed height to accommodate the lowering of the extension unit; and
removing parts from an upper portion of the compartment unit through the open side of the base unit and through an open side of the extension unit.

17. The method of claim 16, wherein the rack is a first rack in an assembly of coupled racks, each of the racks including a base unit defining an upper end and an extension unit slidably mounted with the base unit, the method further including transporting the assembly of coupled racks to an assembly location.

18. The method of claim 16, wherein the step of lowering the extension unit is carried out using an actuator coupled between the base unit and the extension unit.

19. The method of claim 18, wherein the actuator is a linear actuator driven by an electric motor, the method further including electrically coupling the motor with a control unit and using the control unit to control the actuator.

* * * * *